United States Patent [19]

Vowles

[11] Patent Number: 5,401,062

[45] Date of Patent: Mar. 28, 1995

[54] PIPE COUPLING

[75] Inventor: John C. Vowles, Avon, England

[73] Assignee: Seetru Limited, United Kingdom

[21] Appl. No.: 204,352

[22] PCT Filed: Sep. 11, 1992

[86] PCT No.: PCT/GB92/01672
§ 371 Date: Jun. 14, 1994
§ 102(e) Date: Jun. 14, 1994

[87] PCT Pub. No.: WO93/06405
PCT Pub. Date: Apr. 1, 1993

[30] Foreign Application Priority Data

Sep. 14, 1991 [GB] United Kingdom ............... 9119671
Feb. 13, 1992 [GB] United Kingdom ............... 9203042

[51] Int. Cl.[6] .................................... F16L 25/00
[52] U.S. Cl. ............................. 285/12; 285/24; 285/363; 285/84; 285/87; 285/330
[58] Field of Search .................... 285/12, 24, 25, 26, 285/27, 28, 29, 363, 405, 914, 84, 87, 330

[56] References Cited

U.S. PATENT DOCUMENTS 3,287,031 11/1966 Simmons et al. ............. 285/914 X
4,630,847 12/1986 Blenkush ..................... 285/29
4,718,699 1/1988 Kulish et al. ................. 285/24 X
4,790,567 12/1988 Kawano et al. ............... 285/24

Primary Examiner—Dave W. Arola
Attorney, Agent, or Firm—Nixon & Vanderhye

[57] ABSTRACT

A pipe coupling comprises a pair of flanges adapted to be secured together in face to face relation to form a fluid-tight coupling. Each flange incorporates at least one coding device formed to provide a key and a keyway, which coding devices are so disposed and arranged on the flanges that the two flanges can only be secured together to form the fluid-tight coupling if the coding devices on the respective flanges correspond with one another, and each of the pair of coding devices comprising, secured within a hole in a flange, a bar member whose cross section is partly cut away to provide the keyway and key, and the bar member being secured in the hole in one of a predetermined number of relative orientations, selectively achieved by adjusting, by rotation, the bar member in the hole.

11 Claims, 4 Drawing Sheets

PIPE COUPLING

This invention relates to a pipe coupling of the kind in which a fluid-tight coupling is made by securing together in proper mating relationship a pair of opposed flanges, the coupling being equipped with a coded security arrangement whereby only a pair of flanges which are intended to be coupled, can be properly coupled, whereas a pair of flanges not intended to be coupled, are physically prevented from being properly coupled. There is a requirement for such coupling systems and there are many pipe coupling systems which have been proposed which incorporate measures intended to prevent or to discourage such improper coupling or which allow only proper, that is, correctly intended and safe coupling to be made. For example, for reasons of safety and efficiency, it is important to ensure that a fluid may not be piped into a container or into another pipe where it may mix incorrectly with another substance possibly with dangerous, and at the least with inefficient results. Coupling flanges could be identified by labelling or by colour coding, but correct identification would then be dependent upon there being adequate illumination to enable the labels or colours to be seen. Moreover, such labelling or colour coding could be ignored due to inefficiency or oversight; or they may even be deliberately ignored. In order to meet this problem, couplings may be identified by size, by shape or by configuration so that it is mechanically impossible to make improper couplings. Spline couplings or bayonet-type couplings fit into this latter category. However, such systems which are, in effect, coded mechanical systems, have limited flexibility in terms of the ability to make adjustments or checks and are thus of limited utility.

In order to ameliorate this situation, it will be useful to provide a mechanical coded system for such couplings which allows proper coupling and prevents improper coupling; and such a system should advantageously provide a number, and preferably a large number of coding alternatives.

Such provision will be suitable for pipe systems where, as is becoming increasingly common, pipes and associated flanged coupling systems of standard sizes and patterns are employed in a large number of different industrial fields and are used to convey a wide variety of different fluids. For example, there is an increasing tendency for bulk tanker vehicles to be equipped with delivery hose pipes of a standard bore size, of say 75 mm or 85 mm internal diameter; these being coupled, by flanged coupling connections, to static tanks or to other pipes. In some cases, the same bulk tanker vehicle may be required to transport different fluids on different journeys. In such circumstances it will be advantageous if the flange coupling on the delivery hose pipe of the vehicle can be appropriately coded, having regard to the fluid being transported, so that the delivery hose pipe can only be coupled to the flanged inlet pipe of a tank intended to receive that particular fluid, there being inbuilt a mechanical impediment which prevents improper coupling. It will be apparent also that, both for reasons of safety and for reasons of efficient management, any such system of coding for flange-type couplings should present some security against unauthorized interference with the coding system. Such a system should be easy to manufacture and understand; but it should be difficult to defeat or circumvent such a system. The provision of such a system is the objective of this invention.

In its broadest aspect this invention provides a pipe coupling comprising a pair of flanges adapted to be secured together in face to face relation to form a fluid-tight coupling, characterised in that each said flange incorporates at least one coding device formed to provide a key and a key-way, which coding devices are so disposed and arranged on said flanges that the two flanges can only be secured together to form a said fluid-tight coupling if the coding devices on the respective flanges correspond with one another, and each of a said pair of coding devices comprising, secured within a hole in a said flange, a bar member whose cross-section is partly cut away to provide a said key-way and a key, and means for securing said bar member in said hole in one of a predetermined number of relative orientations, selectively achieved by adjusting, by rotation, the bar in its hole.

One preferred example of such a pipe coupling will now be described in greater detail. In this example of a pipe coupling of the kind in which a fluid-tight coupling is made by securing together in proper mating relationship a pair of opposed flanges, the coupling is equipped with a security arrangement whereby only a pair of flanges which are intended to be coupled, can be properly coupled, whereas a pair of flanges not intended to be coupled, are incapable of being properly coupled. This coupling with its security arrangement is characterized by the following features in combination:

(i) each of the flanges of the pair is provided with a hole, the pair of holes being in axial alignment when the coupling is properly made; and there being in each of the pair of holes a bar member;

(ii) each bar member being shaped to define, by reduction of its cross-section, a portion which protrudes from the flange hole to define a key and a cut-back portion which defines a recess or key-way in the flange hole, (iii) said protruding portion of each bar member being received, as a key and keyway fit, in the recess defined by the cut-back portion of its opposing bar member, and vice versa, said pair of bar members being in key and key-way mating register when the coupling is properly made;

(iv) and wherein each of the bar members of the matable pair is adjustable, by rotation in its hole, into a selected one of at least two alternative dispositions, with said pair of bar members being capable of being brought into key and key-way mating register, to allow the coupling to be properly made, only when the bar members have been adjusted, by rotation in their holes, such that, when the flanges are disposed face to face just prior to coupling, one bar member has its protruding portion disposed offset by 180° relative to the disposition of the protruding portion of the other bar member with which it is matable, in key and key-way fashion, when the coupling is properly made.

Preferably, each said flange incorporates at least two said coding devices. If each such coding device can be given a selected one of two possible orientations, its pair device being correspondingly selectively oriented, four coding alternatives are available in such a coupling. Or, if each such coding device can be given a selected one of six possible orientations, its pair device being correspondingly selectively oriented, thirty-six coding alternatives are available in such a coupling. Or again, in the case where each flange is provided with four coding devices, each capable of being adjusted to adopt a selected one of four available orientations, its pair device being correspondingly selectively oriented, there will then be two hundred and fifty six possible coding alternatives for that coupling.

The invention will be described by way of example with reference to the accompanying drawings. In these drawings, a first simplified embodiment of a flanged coupling component is illustrated in FIGS. 1 to 3 while a second embodiment of the invention is illustrated in FIGS. 4 to 10. In these drawings.

Figure 1:
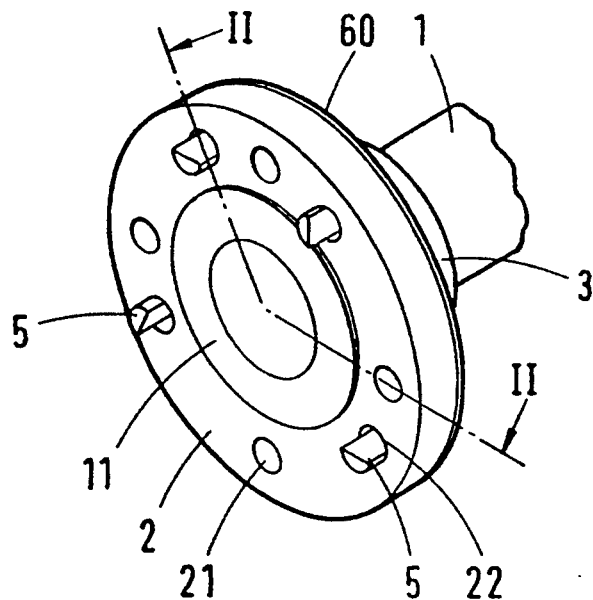
FIG. 1 is a perspective view.
Figure 2:
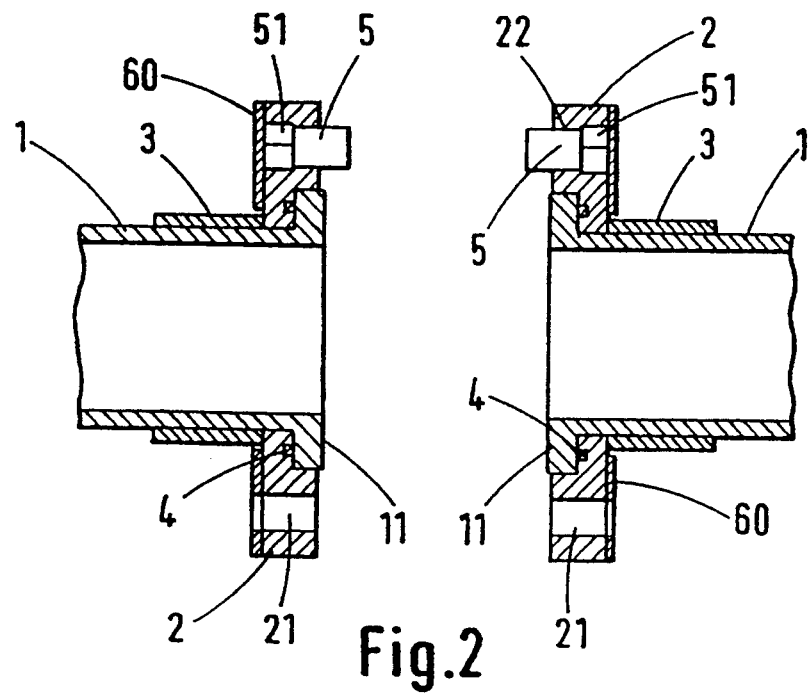
FIG. 2 is a cross-sectional view taken on the lines II—II of FIG. 1.
Figure 3:
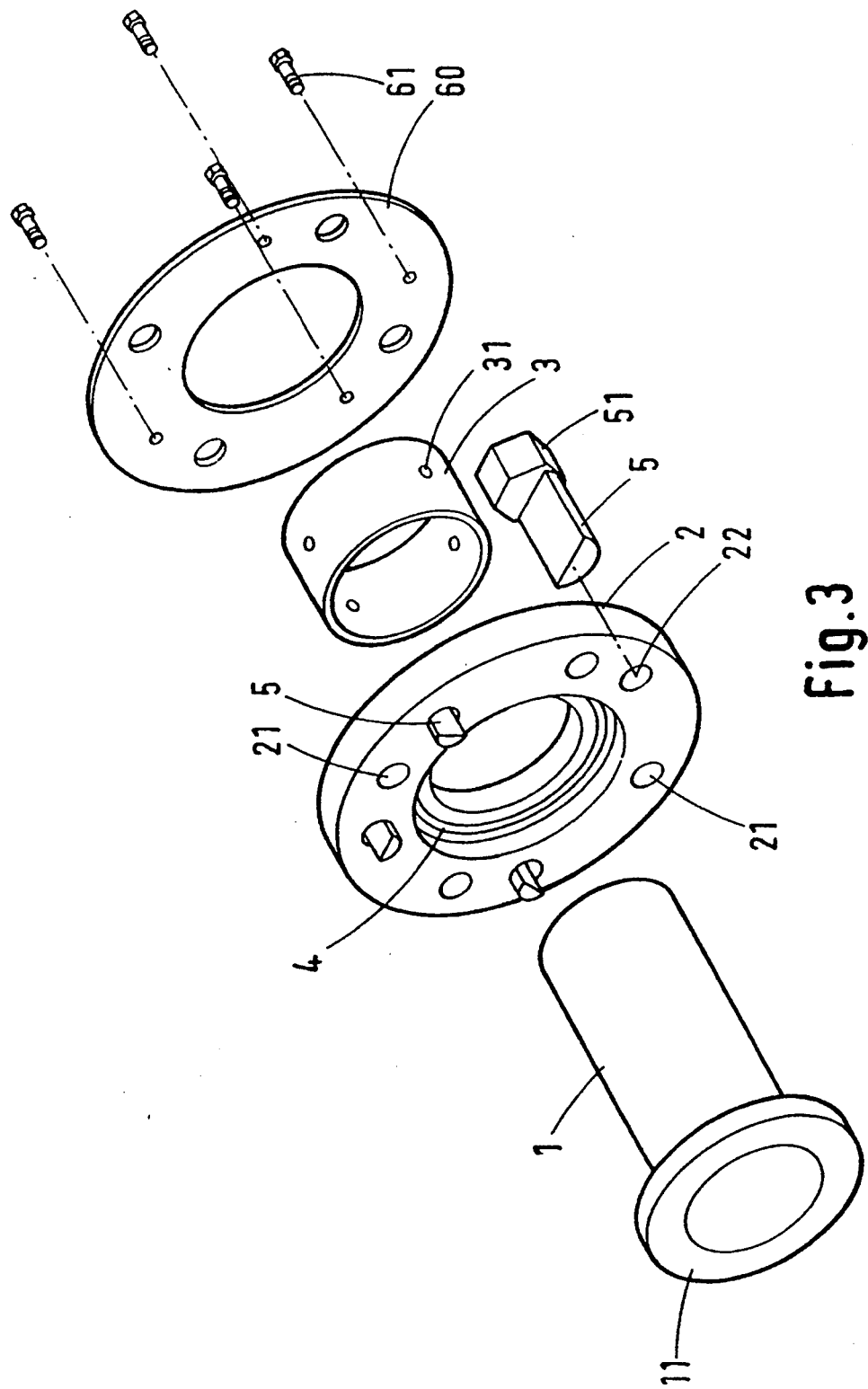
FIG. 3 is an exploded perspective view.

Reference will first be made to FIGS. 1 to 3 which show a first simplified embodiment of the invention. The flanged pipe coupling component shown in FIG. 1 is but half of a complete flanged pipe coupling according to the invention, with the other half of the coupling (not shown) being an identical or complementary component as will be described below, Both halves of the complete coupling, save for the coupling bolts, are shown in FIG. 2.

The coupling shown is intended to form a fluid tight connection between two pipes 1 which may be lengths of rigid piping or they may be short lengths or stubs of piping which are in turn connected to other lengths of piping or of flexible hose.

In the coupling as illustrated, a pipe 1 is equipped with an annular coupling flange 2 secured against a flared portion 11 of the pipe 1 by a sleeve 3 which will be held in place either by a weld or by other conventional securing measures such as grub screws engaged in threaded holes 31 seen in FIG. 3. Optionally, a seal 4 is interposed between the pipe flared portion 1 I and the flange 2. The flange 2 has four equispaced through holes 21 and it will be coupled, usually with an interposed annular sealing washer, to an identical or complementary coupling flange, which also has four equispaced through holes, by bolts passing through such through holes when the set of holes on the two coupling flanges have been brought into register.

Flanged couplings, with two flanges secured in face to face sealed fluid-tight relationship, as so far described, are well known in the art and indeed are the subject of official standards, so that components made by one manufacturer can be interfitted with components made by another manufacturer. Such couplings may be employed to join two pipes, one to the other; or they may be used to join a pipe or a flexible hose to the inlet of a static tank or container. It will be noted that if the two coupling flanges are matched in size and bolt hole configuration, then provided that the two sets of bolt holes can be brought into register, there is no impediment to the coupling being properly made.

It is an object of this invention to provide, for incorporation in such flanged pipe couplings, a simple, but not easily circumvented coded mechanical security system, which allows the coupling of a pair of flanges which are intended to be coupled, but which prevents the coupling of a pair of flanges not intended to be coupled, for example in order to prevent the improper or dangerous mixing of two different fluids.

In its broadest aspect and as exemplified in the embodiment illustrated in FIGS. 1 to 3, this invention provides a pipe coupling comprising a pair of flanges 2 adapted to be secured together in face to face relation to form a fluid-tight coupling as described above, and in addition, each flange 2 incorporates at least one coding device formed to provide a key and a key-way, which coding devices are so disposed and arranged on said flanges that the two flanges can only be secured together to form a fluid-tight coupling if the coding devices on the respective flanges correspond with one another.

Each of a said pair of coding devices comprises, secured within a hole 22 in a said flange 2, a bar member 5. As will be seen in particular from FIG. 3 where one of a plurality of the bar members 5 is shown drawn to a larger scale, the cross-section of the bar member is partly cut away so that when the bar member is fixed in a flange hole 22 and arranged partly to protrude therefrom, there is provided both a key-way and key, such that the protruding portion of the bar member constitutes the key while the portion of the bar which is both cut-away and recessed in its flange hole 22, constitutes a key-way. Each bar member 5, as illustrated in FIG. 3, has a hexagonal head portion 51 which is receivable, as a fit, in a correspondingly hexagonal, recessed portion at the inner end of its hole 22 as is best seen in FIG. 2. Thus each bar member can be secured in its flange hole in a selected one of six possible alternative orientations, selectively achieved by adjusting, by rotation, the bar 5 in its hole 22 and then engaging the hexagonal head 51 of the bar in the hexagonally recessed part of its hole.

As shown, there are four such bar members 5 on the flange 2, each bar member 5 being secured in its hole 22 in a variety of orientations achieved by each bar having been rotated in its hole and then held in a selected orientation.

Also, as shown, each of the head portions 51 is hexagonal as to its peripheral part which fits in a correspondingly shaped part formed at the end of the hole 22 which is remote from the front face of each flange 2, that is the coupling face of the flange. However, the head portions need not be hexagonal; instead a wide variety of shapes can be employed. For example, said predetermined shape may be one of triangular, rectangular, pentagonal, hexagonal or octagonal. Or, the shape may have a non-circular curved periphery, this shape being for example, one is one of oval, oblong, clover-leaf, trefoil, or quatrifoil or other analogous shape with at least three petals.

As shown, the key and key-way portions of the bar members 5 are half cylinders. This is the preferred shape since the bars of opposing flanges are conveniently identical in this respect. However other shapes can be adopted provided that the orientatable key and key-way mating, or interfitting principle is adhered to. For example the protruding portion of each bar could be rectangular in cross section the part of the bar forming a key-way like recess being correspondingly shaped.

Referring to FIG. 2, a complete fluid-tight coupling is made by securing together face to face, in proper mating relationship a pair of opposed flanges 2, with the aid of bolts (not shown) passing through the equispaced bolt holes 21 and secured by nuts (again not shown). Fluid tightness will be obtained by the well known use of an intervening gasket which will be configured to accommodate the fixing bolts in the holes 21 and the coding bars 5 in the holes 22. Each of the flanges 2 of t he pair is provided with the same number (one or more) of holes 22, and as is the case with the bolt holes 21, corresponding holes 22 will be in axial alignment when the coupling is properly made; and there being in each of the pair of holes which correspond, a bar member 5, each bar member being shaped to define, by reduction of its cross-section, a portion which protrudes from its flange hole 22 to define a key, and a cut-back portion which defines a recess or key-way in its flange hole. When two such flanges are brought together to make a complete coupling, the protruding portion of each bar member 5 is received, as a key and key-way fit, in the recess defined by the cut-back portion of its opposing, cooperating bar member, and vice versa, said pair of bar members needing to be in key and key-way mating register if the coupling is to be properly made, Each of the bar members 5 of the matable pair is adjustable, by rotation in its hole 22, into a selected one of at least two alternative dispositions, with said pair of bar members being capable of being brought into key and key-way mating register, to allow the coupling to be properly made, only when the two bar members have been adjusted, by rotation in their holes 22, such that, when the flanges are disposed face to face just prior to coupling, (that is, in the disposition as shown in FIG. 2), one bar member has its protruding portion disposed offset by 180° relative to the disposition of the protruding portion of the other bar member with which it is key and key-way matable when the coupling is properly made.

The bar members 5 each constitute coding devices and preferably, each flange 2 incorporates at least two such coding devices. If each such a coding device can be given a selected one of two possible orientations, its pair device being correspondingly selectively oriented (offset by 180°), four coding alternatives are available in such a coupling. Or, if each such coding device can be given a selected one of six possible orientations, its pair device being correspondingly selectively oriented, thirty-six coding alternatives are available in such a coupling. Or again, in the case as illustrated in FIGS. 1 to 3 of the drawings, where each flange is provided with four coding devices, and if each coding device is capable of being adjusted to adopt a selected one of two available orientations, its pair device being correspondingly selectively oriented, offset by 180°, (as seen when the coupling flanges are disposed face to face), there will then be sixteen possible coding alternatives for that coupling. It will be clear that very many different codes can be made available by these means. Thus, if there are four pairs of bars, each with six possible angular orientations, the total of different codes which can be chosen, amounts to $6^4 = 1,296$.

The coding method thus resides in the possibility of altering the angular orientation of each bar about its own axis and it will be clear that unless the angular orientation of the mating bar on the flange is correspondingly altered, to achieve the 180° offset above referred to, the flanges cannot be made to fit together to face to face liquid tight contact.

The actual assembly of the bars into the flanges can be effected in various ways, but one convenient way is to machine the half round bars from hexagonal bar and leave them integral with a hexagon head of suitable depth. If then the bar holes in the flanges have a hexagonal counter bore of the correct size on the reverse face of the flanges, the bars can be pushed into the flange and will fit in one of six different angular positions, according to the orientation of insertion. Once inserted into the flanges, the bars are conveniently retained by a loose keeper plate or cover 60, which is brought to lie against the back of the flanges and which can be fastened into position with suitable screws 61 (see FIG. 3). This keeper plate 60 will have holes to correspond to the bolt holes of the flanges and the flange bolts will pass through them. The bolt heads and nuts will tighten against the rear face of these keeper plates.

To ensure fitting together of two mutually correctly coded flanges, it is necessary that the angular position of the two flanges on the ends of the hoses or pipes should be correctly aligned relative to one another, so that each half round bar meets its intended counterpart in key and key-way fashion. To this end, the flanges can be provided with mechanical aids to promote alignment such as a spigot pin on one flange engaging in a hole on the opposite flange; or the flanges may be provided with marker flats or notches on their outer rims for lining up purposes. Also for this purpose, one or both flanges can be made rotatable on the hose or pipe ends. In such a case, suitable provision must be made for the sealing gasket to seal on a rim of the pipe or hose, or the rotating flange must be provided with a seal against axial fluid leakage between the rotating flange and the outside diameter of the pipe or hose.

Having described the mechanical elements of which the flange coding mechanism is made up, it is important to note that for effective implementation, certain rules governing orientation, left and right handedness and labelling must be observed. These will be described for coding bars with hexagonal heads and with half-round or half-cylindrical key and key-way portions, but they apply equally for other regular polygonal forms; for example the heads and the key and key-way portions could be rectangular in cross-section.

In the first place, the hexagonal sockets in the back of the flanges which receive the bar heads must all have the same orientation, within the 60° interval dictated by the hexagon, relative to the radius line connecting the centre of the hexagon with the centre of the flange and for example the various sides of the hexagon could be numerically labelled, Next, the flange sockets may be identified by, say, letters and in order to bring together corresponding letters on mating flanges it will be realised that the letter sequences on the two flanges must have opposing handedness, one right handed and the other left handed, when viewed end on. For the correct angular alignment of the mating flanges, these may have aligning marks on flats on their cylindrical outer surface, as already described, and the lettering sequences of the coding bar sockets as a whole must have the same angular orientation to the aligning marks on the two flanges, but in a right or left handed sense, according to the handedness of the lettering sequences themselves. It will be advantageous if the flange sockets display a peripheral mark or notch with which numbered flats on the hexagonal bar heads can be lined up. These notches again for two identically lettered sockets on the right and left handed lettered flanges must have the same angular orientation relative to the radius line connecting socket centre to flange centre. Preferably, all peripheral marks should have such common angular orientation. Finally the configuration of the coding bars themselves must be considered and the numbering of the flats of the hexagonal heads of the bars is possible, size of bar permitting. It will be the aim to line up equally numbered fiats with the peripheral marks of equally lettered sockets in mating flanges.

To achieve this conveniently, it will be useful if four requirements are satisfied:
 (i) The plane of the flats of the key and key-way portions of the half round bars might be perpendicular to a parallel pair of flats of the hexagonal heads.
 (ii) The two numbers labelling these flats might be the same for all the bars, and preferably they should be 1 and 4.
 (iii) The semicircle of the bar, when viewed from the hexagon end, and with the flat no. 1 on top. and the flat no. 4 on the bottom, should always be on the same side, say, on the left side.
 (iv) The flats, other than 1 and 4 might have two number labels each, so that starting from the number 1 there will be both a right handed number sequence and a left handed one. Thus, the four flats in question will have respectively numbers 2-6, 3-5, 5-3, 6-2.

With this achieved, a pair of mating bars will properly fit together if the same number of a right handed sequence on a bar lines up with the peripheral mark as that of a left handed sequence on the other mating bar. It will be convenient if all the bars in one flange used the same handed sequence of flat label numbers, and preferably, though not necessarily, the same handedness as that of the letter sequence of the hexagonal sockets themselves.

Thus the coding specification of one flange might read:

| A | B | C | D |
|---|---|---|---|
| 2 | 4 | 1 | 6 |
| Right Handed | | | | and that of the mating flange

| A | B | C | D |
|---|---|---|---|
| 2 | 4 | 1 | 6 |
| Left Handed | | | |

It will be seen that the system described offers a potentially large number of coded possibilities entirely according to the available number of discrete angular positions of the bars 5 and the number of bars employed.

Figure 8:
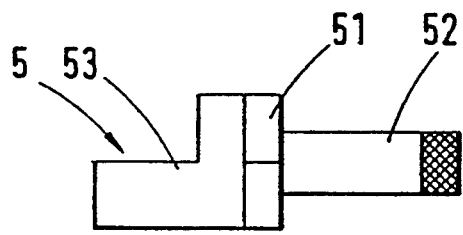
FIGS. 8 to 10 illustrate a coding pin as employed in the coupling of FIGS. 4 to 7, FIG. 8 being a side view, FIG. 9 being a perspective view, and FIG. 10 being an end view.
Figure 9:
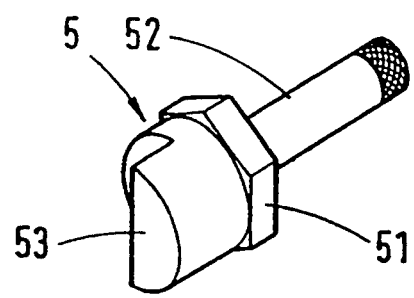
Figure 10:
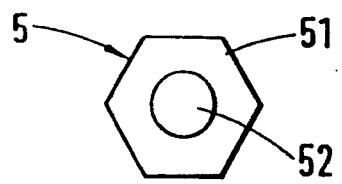

Reference will now be made to the second embodiment of the invention illustrated in FIGS. 4 to 7 of the drawings. Reference will also be made to FIGS. 8 to 10 where a modified coding bar is illustrated. In these drawings like reference numerals are used to identify components which are similar to those previously described with reference to FIGS. 1 to 3.

FIGS. 4 to 7 of the drawings show a coupling flange 2 which carries coding devices in the form of bars 5 which in general, are similar and operate in a similar manner to the coding bars 5 previously described with reference to the embodiment shown in FIGS. 1 to 3. However, as shown in FIGS. 8 to 10, these bars 5 have a stem 52 extending in one direction from a hexagonal head portion 51, while extending from the portion 51 in the opposite direction is a half-round portion 53. The stem 52 is of reduced diameter as compared with that of the remainder of the bar 5.

Figure 6:
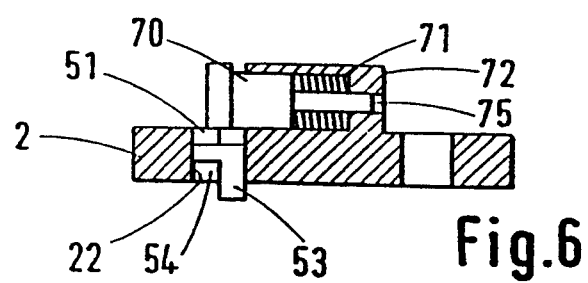
FIG. 6 is a sectional elevation taken on the section lines B—B of FIG. 5.
Figure 7:
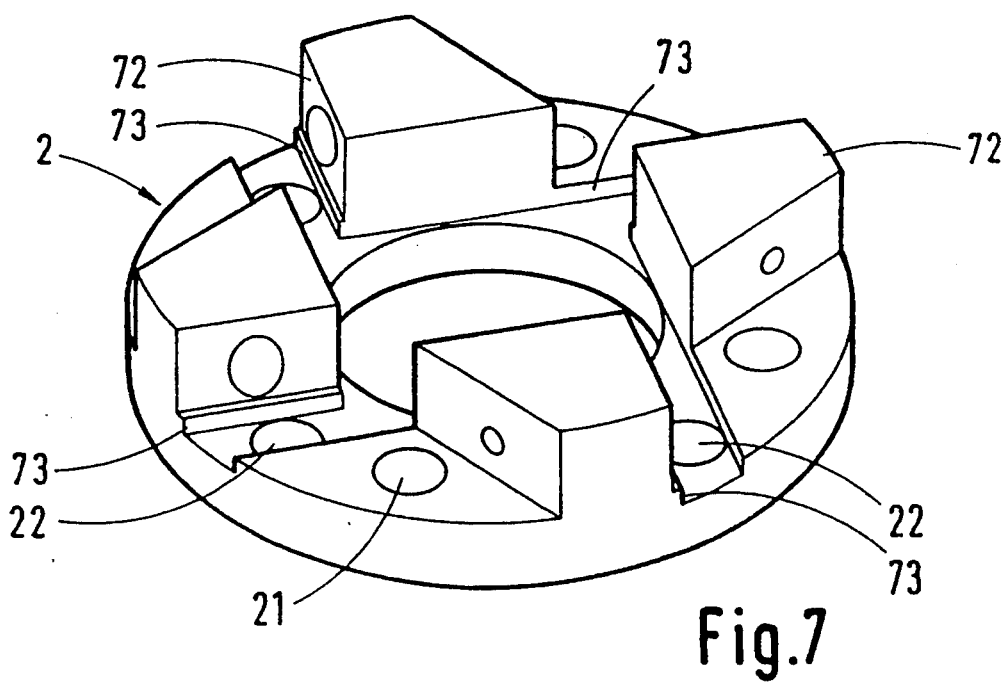
FIG. 7 is a skeletal perspective view of a flange being one of the Components of the coupling of FIGS. 4 to 6.

Two or more of these bars 5 are disposed in preformed holes 22 in a coupling flange 2 shown in perspective in FIG. 7. These components are also to be seen clearly in FIG. 6, where it is shown that when a coding bar 5 is properly disposed in a flange hole 22, the half-round portion 53 partly protrudes from the face of the coupling flange 2 while the cut-away part of the bar also defines a half-round recess 54 in the coupling flange 2.

As is shown in FIG. 6, the stem 52 of each coding bar 5 is engaged by a plunger 70 which is strongly loaded by a spring 71 and guides in a bore formed in a boss 72 formed integrally on e flange 2. As shown in FIG. 7, the flange 2 has four such integrally formed bosses 72 equally distributed.

As will also be seen best in FIG. 7, the flange 2 has four evenly distributed grooves 73, and these have parallel side walls which are spaced apart over a distance which just exceeds the distance across the flats of the hexagonal head portion 51 of the bars 5, so that such head portion 51 can be received in the groove 73 and held there, secured by the spring loaded plunger 70 which butts against the stem 52 which is of reduced section as compared with the remainder of the bar 5, the plunger engaging behind the larger hexagonal portion 51 to prevent withdrawal of the bar 5. The plunger 70, usefully has a guide stem portion 75 which is slidable in a guide hole formed at the end of the bore in each boss 72.

Retraction of the plunger 70, by urging it inwardly of its boss 72 strongly resisted by the spring 71, enables the bar 5 to be withdrawn to disengage the flats of its hexagonal portion 51 from the groove 73 in which the portion 51 sits; and the bar can then be rotated for reorientation and recoding. The spring 71 is advantageously very strong so that the plunger 70 can only be retracted using a purpose designed tool Which engages the nose of the plunger, for example with a fork which traverses the bar stem 52 in such manner that the bar can be withdrawn then for reorientation as described. In this connection it will be noted that the bar stem 52 largely masks the nose of the plunger so that the latter is not easily accessible using ordinary tools. Also it will be noted that as shown the bosses 72 have an irregular shape such that they too are difficult to engage using anything but a purpose designed tool. These measures are taken to prevent unauthorized tampering once the coding has been authoritatively set.

The arrangement of the locking plungers 70 is then such that they can be pushed back into their housing only by means for example, of a special tool with a forked tongued end. Such a tool might be provided with a linear stroke along the axis of the locking plunger, and it is preferably urged forward by suitable toggle means which will allow ready compression of the strong spring 71 inserted behind the locking plunger in its housing boss 72.

Toggle clamps suitably disposed on a robust base plate and allowing appropriate positioning of the coupling flange 2 on it may constitute such a releasing tool, and such a base plate could be positioned positively relative to the flange 2 by engagement with the bolt holes 21 of the flange 2. The provision of such a tool with two or even four toggles is entirely feasible and power or foot operated lever means may be employed to release all the locking plungers on a flange in one operation. Once released, the coding bars may be lifted from their sockets by means of the central stems and rotated and reinserted into the security flange sockets in a new orientation as required by a new code, suitable for possibly a new liquid product for which the pipe and hose is to be used.

The locking plungers 70 also have the smaller diameter stem 75 at their rear end to pass through a suitable hole in the rear wall of the housing boss 72. Such a rear extension stem will serve to keep each locking plunger 70 in correct axial alignment in its housing and it will also act as a guide for the spring which is fitted between the rear wall of the housing and rear face of the plunger head. Such a spring may be a robust coil spring, but a particularly convenient execution is provided by the use of coned spring washers, also termed Belleville washers. Such washers stacked in suitable arrangements can provide a particularly convenient and powerful spring in a restricted space, and also a spring which can be very flexible while maintaining a high spring load, i.e. a spring which in a restricted volume can provide a low spring rate over a given spring stroke, while maintaining a high spring load.

As a further feature, the locking plunger bosses or housings 72 are shaped to have an external rear face which is inclined to the housing axis and is not parallel to the bore face from which the locking plunger protrudes. When positioned appropriately relative to the pitch circle of the bolt holes 21 of the security flange 2, this inclined rear face may serve as a keying abutment for one side of the hexagonal head of the flange bolt engaged in each bolt hole 21.

The arrangement has the great advantage that the security flange when offered up against its mating companion flange, which may have either fixed, or as in FIG. 3, permanently locked coding bars, can easily be bolted up in a single handed operation by pushing a bolt through each of a pair of aligned bolt holes 21, one in each of the flanges being coupled, and applying nuts to the threaded ends of the bolts to tighten against the back of the companion flange. The hexagonal flange on each bolt will be prevented from rotating by abutment with the oblique rear face of the locking plunger housing 72.

As stated above, a further advantage of the approximately trapezoidal plan contour of the locking boss is that any attempt at unauthorized tampering with the locking mechanism is rendered extremely difficult, because only a dedicated and rather complex releasing tool will allow depression of the locking plunger, and the attempted use of 'G' clamps or heavy pipe clamps on the housings is practically impossible.

It will be seen that the security flange constitutes an element whose shape is complex and which, while it may be machined from stainless steel, will be more conveniently cast as a precision casting on which all the complex faces will at once be formed in the casting process.

This also applies to the grooves for the coding bar heads which may either be hexagonal or as shown, they may be in the form of narrow, parallel walled channels extending through the radial width of the flange, though not necessarily in a radial direction, The width of these channels will just allow the across the flats diameter of the hexagonal coding bar heads to enter but will not allow it to rotate.

Figure 4:
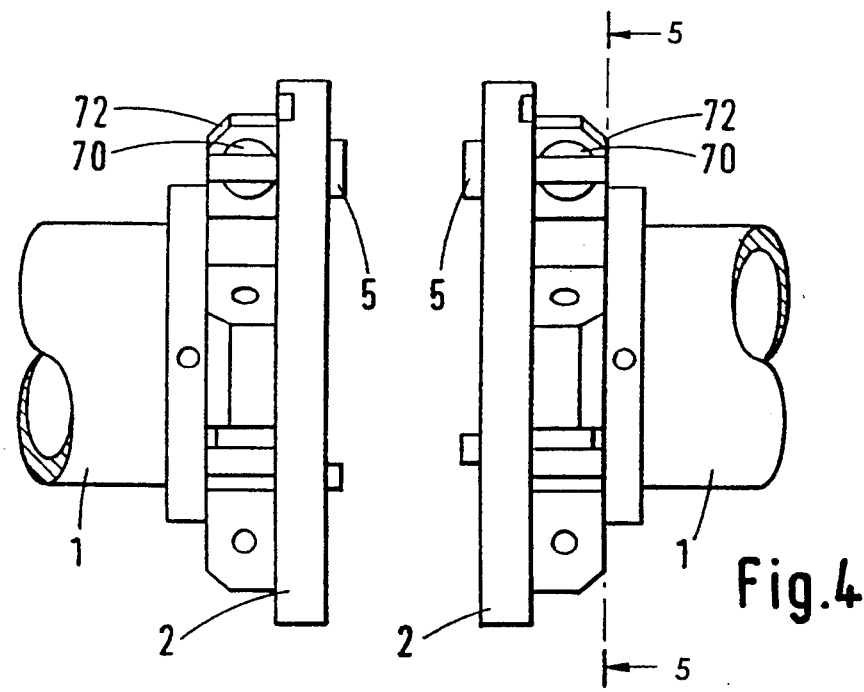
FIG. 4 is a side view.
Figure 5:
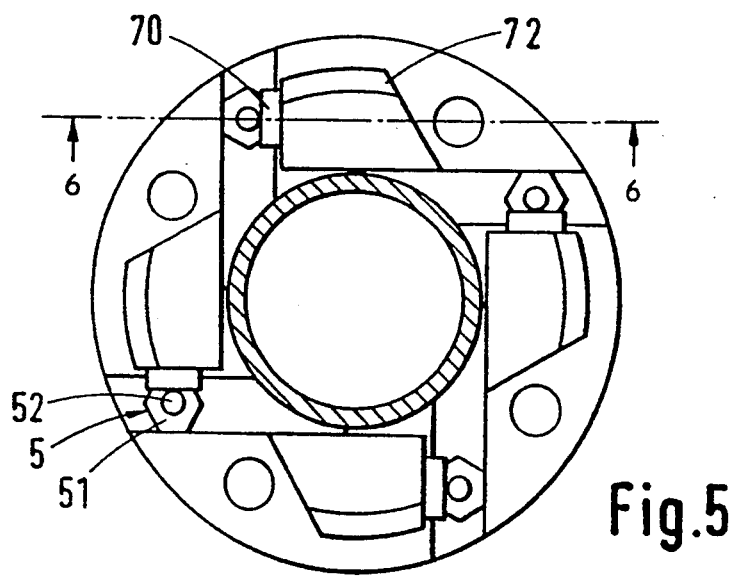
FIG. 5 is an end view taken on the section lines A—A of FIG. 4.

The companion flange to which the security flange is joined may be of similar construction, as shown in FIG. 4, or alternatively, it may be of simpler execution in which the coding bars are locked in by a screwed on cover plate, as described with reference to and as shown in FIGS. 1 to 3. Such an arrangement may be logical if the mating flange is considered to be fixed so as far as the coding bars are concerned, because it is fitted to a pipe outlet which is designed to receive only one specific liquid product.

The coupling flange 2 of FIGS. 4 to 7 may be rotatable on a short length of rigid pipe, and together with the companion flange on the end of a pipe to be coupled, it may have code labelling markings as described above. Alternatively, the coding markings or other identification means may be confined to the setting tool by suitable means which makes re-coding the security flange readily possible when the coding bars are released. The fixed companion flange may be code set once and for all, and the applied coding on the given flange system may be identified by, say, a small loose wired metal shield.

The important preferred subsidiary features of the invention may be summarized as follows.

Each of said flanges (2) to be coupled incorporates at least two said coding devices each consisting of a bar member (5) disposed in a hole (22) in a flange (2). Each bar member (5) has a head portion (51) which is of a predetermined shape which is a keying fit in a correspondingly shaped recess in one end of a flange hole (22), the head portion (51) being fittable in said shaped recess in a flange hole (22) in one of a predetermined number of relative orientations. This said predetermined shape is one of triangular, rectangular, pentagonal or hexagonal; or it may be a shape which has a non-circular curved periphery, this shape being for example, one of oval, oblong, clover-leaf, trefoil, or quatrifoil or other analogous shape with at least three petals.

Preferably, as in FIGS. 1 to 3, there is included a masking plate (60) secured to a said flange (2) and locking a bar member (5) in place in a flange hole (22), such that adjustment, by rotation of said bar member in its hole, cannot be accomplished until said masking plate is removed.

Or alternatively, and as shown in FIGS. 3 to 1 0, there may be provided, for securing each bar member (5) in its flange hole (22), a spring loaded plunger (70,75) movable within a housing (72) integral with the flange (2) in which the bar member (5) is mounted, said plunger engaging behind a head portion (51) of the bar member, said plunger (70,75) bearing against a stem (52) of the bar member (5) which is of reduced cross-sectional size as compared with the shaped head portion (51) of the bar member, such that adjustment, by rotation of the bar member in its hole, cannot be accomplished until the plunger is moved from engagement behind the head portion (51) of the bar member.

I claim:

1. A pipe coupling comprising a pair of flanges adapted to be secured together in face to face relation to form a fluid-tight coupling, wherein each said flange includes at least one coding device formed to provide a key and a key-way, which coding devices are so disposed and arranged on said flanges that the two flanges can only be secured together to form a said fluid-tight coupling if the coding devices on the respective flanges correspond with one another, and wherein each of a pair of said coding devices comprises a hole defined in a said flange, and a bar member secured within said hole in one of a predetermined number of relative orientations, selectively achieved by adjusting, by rotation, the bar in said hole, and wherein said bar member is partly cut away along its transverse cross-section with said cut away extending into said hole to thereby provide a said key-way and key.

2. A pipe coupling of the kind in which a fluid-tight coupling is made by securing together in proper mating relationship a pair of opposed flanges, the coupling being equipped with a security arrangement whereby only a pair of flanges which are intended to be coupled, can be properly coupled, whereas a pair of flanges not intended to be coupled, are incapable of being properly coupled, wherein said coupling with its security arrangement comprising in combination:

(i) a coding device provided with each of the flanges of said pair of opposed flanges, said coding device including a pair of holes each formed in a respective flange and being in axial alignment when the coupling is properly made, and a bar member disposed in each of the holes;

(ii) each bar member being shaped to define, by reduction of its transverse cross-section, a portion which protrudes from its flange hole to define a key and a cut-back portion which defines a recess in the flange hole;

(iii) said protruding portion of each bar member being received, as a key and key-way fit, in the recess defined by the cut-back portion of its opposing bar member, and vice versa, said pair of bar members being in key and key-way mating register when the coupling is properly made; and wherein (iv) each of the bar members of the matable pair is adjustable, by rotation in its hole, into a selected one of at least two alternative dispositions, with said pair of bar members being capable of being brought into key and key-way mating register, to allow the coupling to be properly made, only when the bar members have been adjusted, by rotation in their holes, such that, when the flanges are disposed face to face just prior to coupling, one bar member has its protruding portion disposed offset by 180° relative to the disposition of the protruding portion of the other bar member with which it is matable, in key and keyway fashion, when the coupling is properly made.

3. A coupling according to claim 1 or claim 2, wherein each of said flanges to be coupled includes at least two said coding devices each consisting of a bar member (5) disposed in a hole in a flange.

4. A coupling according to claim 1 or claim 2, wherein each bar member has a head portion which is of a predetermined shape which is a keying fit in a correspondingly shaped recess in one end of a flange hole, the head portion being fittable in said shaped recess in a flange hole in one of a predetermined number of relative orientations.

5. A coupling according to claim 4, wherein said predetermined shape is one of triangular, rectangular, pentagonal, hexagonal or octagonal.

6. A coupling according to claim 4, wherein said predetermined shape has a non-circular curved periphery.

7. A coupling according to claim 6, wherein said predetermined shape is one of oval, oblong, and foliant shape.

8. A coupling according to claim 7, wherein said predetermined shape is a foliant shape selected from one of clover-leaf, trefoil and quatrifoil shapes.

9. A coupling according to claim 1 or claim 2, and including a masking plate secured to a said flange and locking a bar member in place in a flange hole, such that adjustment, by rotation of said bar member in its hole, cannot be accomplished until said masking plate is removed.

10. A coupling according to claim 1 or claim 2, wherein,
said bar member includes a head portion, and wherein said coding device further includes,
a housing integral with the flange in which the bar member is mounted, and
a spring loaded plunger movable within said housing and engageable behind said head portion of the bar member for securing each bar member in its flange hole.

11. A coupling according to claim 10, wherein said bar member includes a stem which is of reduced cross-sectional size as compared with the head portion of the bar member, said plunger bearing against said stem such that adjustment, by rotation of the bar member in its hole, cannot be accomplished until the plunger is moved from engagement behind the head portion of the bar member.

* * * * *